United States Patent
Oliver

(10) Patent No.: US 12,019,782 B1
(45) Date of Patent: Jun. 25, 2024

(54) PRIVACY PROTECTION FOR CUSTOMER EVENTS LOGS OF CYBERSECURITY EVENTS

(71) Applicant: Trend Micro Incorporated, Tokyo (JP)

(72) Inventor: Jonathan James Oliver, Melbourne (AU)

(73) Assignee: Trend Micro Incorporated, Tokyo (JP)

( * ) Notice: Subject to any disclaimer, the term of this patent is extended or adjusted under 35 U.S.C. 154(b) by 249 days.

(21) Appl. No.: 17/530,680

(22) Filed: Nov. 19, 2021

(51) Int. Cl.
*G06F 21/62* (2013.01)
*H04L 9/32* (2006.01)
*H04L 9/40* (2022.01)

(52) U.S. Cl.
CPC ........ G06F 21/6245 (2013.01); H04L 9/3255 (2013.01); H04L 63/1425 (2013.01)

(58) Field of Classification Search
CPC ............... G06F 21/6245; H04L 9/3255; H04L 63/1425
See application file for complete search history.

(56) References Cited

U.S. PATENT DOCUMENTS

| | | | | |
|---|---|---|---|---|
| 6,189,036 | B1* | 2/2001 | Kao | G06F 9/468 709/225 |
| 9,660,813 | B1* | 5/2017 | van Dijk | H04L 63/0853 |
| 10,673,880 | B1* | 6/2020 | Pratt | H04L 63/1425 |
| 11,888,870 | B2* | 1/2024 | Garyani | H04L 63/1441 |
| 2003/0120931 | A1* | 6/2003 | Hopkins | H04L 9/3255 713/180 |
| 2017/0149793 | A1* | 5/2017 | Spertus | G06F 21/6245 |
| 2017/0169252 | A1* | 6/2017 | Ukena-Bonfig | G06F 21/6254 |
| 2019/0372999 | A1* | 12/2019 | Young | H04L 63/1433 |
| 2020/0073741 | A1* | 3/2020 | Wang | G06F 11/0751 |
| 2020/0213130 | A1* | 7/2020 | Zhang | G06F 16/2365 |
| 2021/0264057 | A1* | 8/2021 | Murray | G06F 16/284 |
| 2022/0114579 | A1* | 4/2022 | Beck | G06Q 20/326 |

OTHER PUBLICATIONS

Wikipedia—Secret sharing, 8 sheets [retrieved on Nov. 17, 2021], retrieved from the internet: https://en.wikipedia.org/wiki/Secret_sharing.
Wikipedia—Federated learning, 12 sheets [retrieved on Nov. 17, 2021], retrieved from the internet: https://en.wikipedia.org/wiki/Federated_learning.

(Continued)

*Primary Examiner* — Shin-Hon (Eric) Chen
*Assistant Examiner* — Ethan V Vo
(74) *Attorney, Agent, or Firm* — Beyer Law Group LLP

(57) ABSTRACT

System and methods of analyzing customer events logs for cybersecurity with privacy protection are disclosed. Events logs of cybersecurity events are received from customer computers. Customers in the events logs are represented with ring signatures. Candidate features that occur in a group of events are identified in the events logs. A candidate feature is analyzed, based on corresponding ring signatures, to determine if the candidate feature can be attributed to a customer or a limited number of customers. If so, the candidate feature is considered private and is discarded. Otherwise, the candidate feature is retained as public data suitable for use in cybersecurity operations.

12 Claims, 4 Drawing Sheets

(56) References Cited

OTHER PUBLICATIONS

Wikipedia—Secure multi-party computation, 11 sheets [retrieved on Nov. 17, 2021], retrieved from the internet: https://en.wikipedia.org/wiki/Secure_multi_party_computation.
Wikipedia—Monero, 9 sheets [retrieved on Nov. 17, 2021], retrieved from the internet: https://en.wikipedia.org/wiki/Monero.
Wikipedia—K-anonymity, 6 sheets [retrieved on Nov. 17, 2021], retrieved from the internet: https://en.wikipedia.org/wiki/K-anonymity.
Wikipedia—Differential privacy, 11 sheets [retrieved on Nov. 17, 2021], retrieved from the internet: https://en.wikipedia.org/wiki/Differential_privacy#;~.text=Differential privacy (DP) is a, about individuals in the dataset.
Wikipedia—Ring siganture, 6 sheets [retrieved on Nov. 17, 2021], retrieved from the internet: https://en.wikipedia.org/wiki/Ring_signature.
Josep Domingo-Ferrer, et al. "A Critique of K-Anonymity and Some of Its Enhancements", 2008, pp. 990-993, The Third International Conference on Availability, Reliability and Security, IEEE Computer Society.
Yves-Alexander De Montjoye, et al. "Unique in the Crowd: The privacy bounds of human mobility", 2013, pp. 1-5, Massachusetts Institute of Technology, Cambridge, MA.
Jonathan Oliver "Limitations of Privacy Solutions for Log Files", Aug. 31, 2021, pp. 1-9.
Wei Jiang, et al. "Privacy-Preserving Distributed k-Anonymity", 2005, pp. 166-177, IFIP International Federation for Information Processing.
Khaled El Eman, et al. "A critical appraisal of the Article 29 Working Party Opinion May 2014 on data anonymization techniques", 2015, pp. 73-87, International Data Privacy Law, vol. 5, No. 1.
Pierangela Samarati and Latanya Sweeney, "Protecting Privacy when Disclosing Information: k-Anonymity and Its Enforcement through Generalization and Suppression", pp. 1-19, Computer Science Laboratory, SRI International, Menlo Park, CA; Laboratory for Computer Science, MIT, Cambridge, MA.
Cynthia Dwork, et al. "Calibrating Noise to Sensitivity in Private Data Analysis", 2006, pp. 265-284, Microsoft Research, Silicon Valley; Ben-Gurion University; Weizmann Institute of Science.
Jonathan Oliver "Decode 2021 It's Time To Decide—A Survey of Technical Privacy Solutions", 35 sheets, Trend Micro.
Article 29 Data Protection Working Party—Opinion May 2014 on Anonymisation Techniques, Adopted on Apr. 10, 2014, pp. 1-37.
Charu C. Aggarwal and Philip S. Yu, Chapter 2 "A General Survey of Privacy-Preserving Data Mining Models and Algorithms", 2008, pp. 1-43, IBM T. J. Watson Research Center, Hawthorne, NY; University of Illinois, Chicago, IL.

* cited by examiner

PRIVACY PROTECTION FOR CUSTOMER EVENTS LOGS OF CYBERSECURITY EVENTS

TECHNICAL FIELD

The present invention is directed to analysis of customer events logs for cybersecurity with privacy protection.

BACKGROUND

Computer networks may perform event monitoring and logging as part of their cybersecurity measures. More particularly, a computer network may monitor for events of actual or potential cyber attacks, such as unauthorized intrusion, phishing, advanced persistent threat, etc. Detected events and corresponding event data may be logged in an events log, which is also referred to as a log file. The events log may be analyzed to identify a cyber attack or exploitable weakness in the computer network.

Various privacy requirements have been put in place to protect personal data. An example of such privacy requirements is the General Data Protection Regulation (GDPR) law enacted by the European Union. Because events logs may contain personally identifiable information, privacy measures must be put in place during storage and analysis of events logs and dissemination and use of information obtained from the analysis. This is particularly difficult when the analysis is performed by a cybersecurity vendor. More particularly, the vendor needs to be able to analyze events logs of customers ("customer events logs") while ensuring privacy of identities noted in the events logs.

A cybersecurity vendor, such as Trend Micro Incorporated, provides various products to its customers, including outsourced cybersecurity services (e.g., Managed Detection and Response), security appliances, antivirus software, etc. Privacy requirements pose difficult challenges to the vendor because the vendor is a third-party relative to the vendor's customers. The vendor may also employ the services of yet another third-party, such as a cloud computing infrastructure for storage and processing of customer events logs. The cloud computing infrastructure or server computer system employed by the vendor may also be physically located in a jurisdiction that exposes the events logs for seizure by the government.

There are many conventional anonymization techniques that may be employed to provide privacy protection to customer descriptive data. Examples of such anonymization techniques include differential privacy, k-anonymity, homomorphic encryption, ring signatures as used in the Monero cryptocurrency, multiparty computation, etc. However, the inventor believes that these anonymization techniques, as currently employed, are not suitable or practical when it comes to customer events logs.

BRIEF SUMMARY

System and methods of analyzing customer events logs for cybersecurity with privacy protection are disclosed. Events logs of cybersecurity events are received from customer computers. Customers in the events logs are represented with ring signatures. Candidate features that occur in a group of events are identified in the events logs. A candidate feature is analyzed, based on corresponding ring signatures, to determine if the candidate feature can be attributed to a customer or a limited number of customers. If so, the candidate feature is considered private and is discarded. Otherwise, the candidate feature is retained as public data suitable for use in cybersecurity operations.

These and other features of the present disclosure will be readily apparent to persons of ordinary skill in the art upon reading the entirety of this disclosure, which includes the accompanying drawings and claims.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
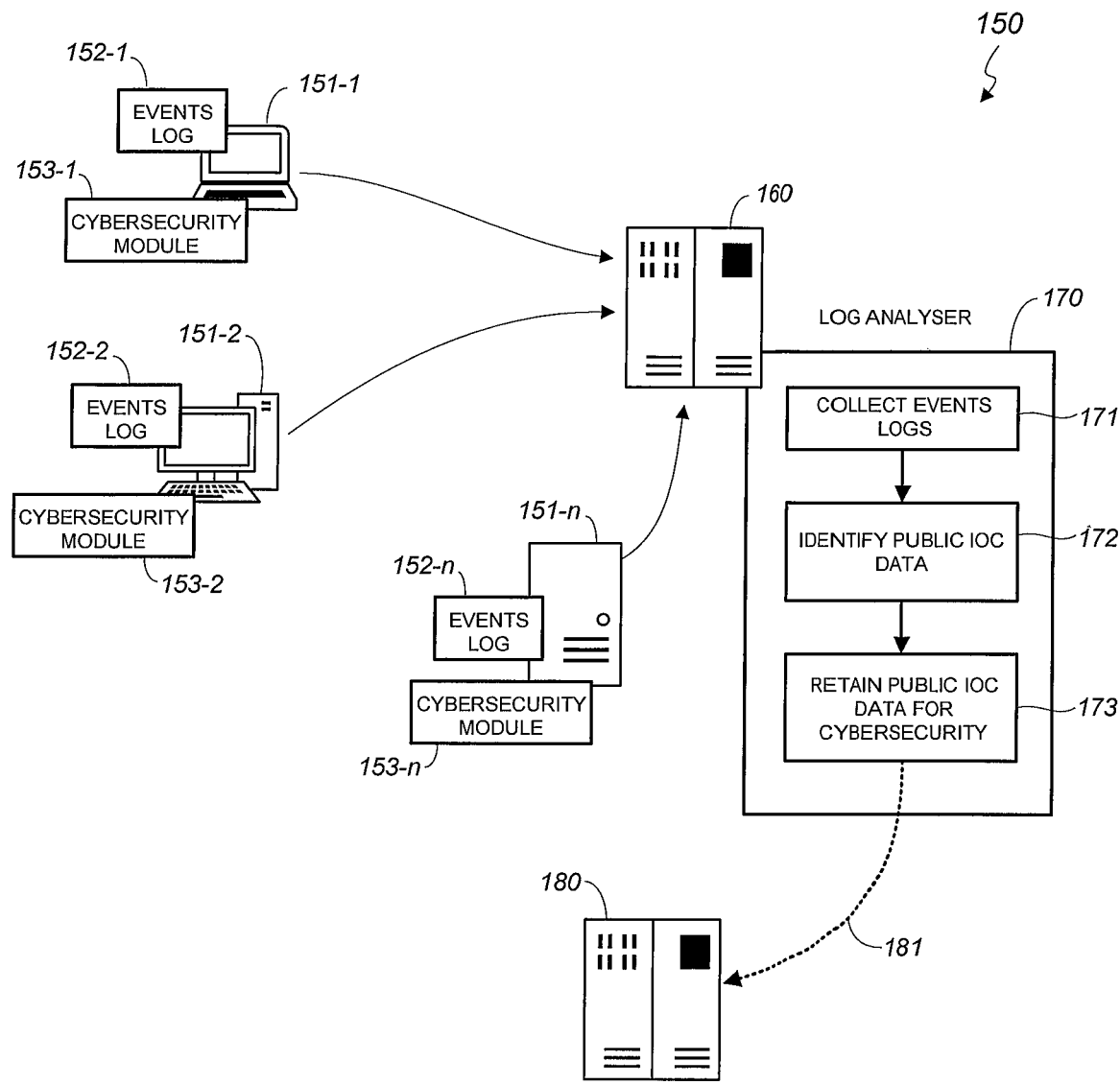
FIG. 1 shows a logical diagram of a system of analyzing customer events logs for cybersecurity with privacy protection in accordance with an embodiment of the present invention.

In the present disclosure, numerous specific details are provided, such as examples of systems, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Privacy concerns, both from governments and customers, pose challenges to cybersecurity vendors because cybersecurity operations involving events logs typically require processing, such as clustering, correlation, and pivoting, of event data to identify indicators of compromise (IoC), i.e., data that is indicative of a cyber attack. As will be more apparent below, embodiments of the present invention allow processing of events logs for cybersecurity purposes while addressing privacy concerns.

A typical customer descriptive data is shown in Table 1 below.

TABLE 1

| Cust ID | Cust Name | Contact Name | Contact Email | Country | Industry | Size |
|---|---|---|---|---|---|---|
| 1 | ABC Company | Person A | a@abc.com | ARG | Acct | 10 |
| 2 | B Company | Person B | b@b.com | BRZL | Mfg | 100 |
| … | … | … | … | … | … | … |
| 100 | C Company | Person C | Z@z.com | USA | Health | 20 |

The customer descriptive data of Table 1 is a customer list that indicates, from left to right, a customer identifier, customer name, contact name, contact email address, country, industry segment, and number of employees for each customer. The customer descriptive data is arranged as a table structure, with one data row ("row") per customer and multiple columns that describe the customer in each row.

A customer events log typically consists, either implicitly or explicitly, of two separate table structures. Table 2 below shows an example first table of a customer events log.

TABLE 2

| PID | Description 1 | Description 2 |
|-----|---------------|---------------|
| P1  | ...           | ...           |
| P2  | ...           | ...           |
| ... | ...           | ...           |
| Pj  | ...           | ...           |

Table 2, which is a first table of a customer events log, is a descriptive table that describes personal identifiers (PID) P1, P2, . . . Pj. Each personal identifier identifies a customer. Depending on context, a "customer" may be a home user, an organization (e.g., company, department), or a user of the organization. Each row of Table 2 has columns that describe a particular personal identifier, such as email address, telephone number, department, social security number, physical location, computer Internet Protocol (IP) address, etc. Table 3 below shows an example of a second table of a customer events log.

TABLE 3

| PID | Event ID | Data 1 | Data 2 | Data n |
|-----|----------|--------|--------|--------|
| P1  | Event_1  | ...    | ...    | ...    |
| P1  | Event_2  | ...    | ...    | ...    |
| P1  | Event_3  | ...    | ...    | ...    |
| ... | ...      | ...    | ...    | ...    |
| Pj  | Event_j  | ...    | ...    | ...    |

Table 3, which is a second table of a customer events log, contains data of cybersecurity events. A cybersecurity event ("event") is an occurrence of an actual or potential cyber attack, such as an unauthorized intrusion, computer viruses, malicious emails, etc. Table 3 is also referred to herein as an events table.

Unlike Table 2, which contains data describing personal identifiers, Table 3 contains data describing events associated with the personal identifiers. That is, each event (as opposed to personal identifier) has a unique row in Table 3. The example of Table 3 indicates, from left to right, a personal identifier (PID) associated with the event, event identifier, and data of the event. Accordingly, a personal identifier may appear in several rows in Table 3. In the example of Table 3, the events Event_1, Event_2, and Event_3 are all attributed to the identity with the personal identifier P1. Therefore, three rows in Table 3 have the personal identifier P1.

Because the same personal identifier may appear in several rows of an events table, conventional anonymization techniques currently employed on customer descriptive tables are not suitable or practical when employed on customer events logs. In particular, anonymization techniques involving data suppression, generalization, encryption, hashing, and error addition, as currently employed, will discard the vast majority of data in the events tables of the customer events logs, thereby making event data meaningless, will take too long to process, and/or cannot be processed with adequate privacy protection.

FIG. 1 shows a logical diagram of a system 150 for analyzing customer events logs for cybersecurity with privacy protection in accordance with an embodiment of the present invention. The system 150 includes a plurality of customer computers 151 (i.e., 151-1, 151-2, . . . , 151-n), a backend system 160, and a server computer 180. Components of the system 150 communicate over a computer network, which may include the Internet.

A customer computer 151 may be a laptop computer, desktop computer, server computer, or other computing device of a customer of a cybersecurity vendor that maintains and operates the backend system 160. A customer computer 151 hosts a cybersecurity module 153 (i.e., 153-1, 153-2, . . . , 153-n), which is configured to perform one or more cybersecurity operations for guarding against cyber attacks. A cybersecurity module 153 may be an antivirus software, intrusion detection system, firewall, etc. Cybersecurity events ("events") detected by a cybersecurity module 151 are logged into a corresponding events log 152 (i.e., 152-1, 152-2, . . . , 152-n).

Table 4 below shows event data that may be included in an example events log 152.

TABLE 4

| Customer | Location  | Event    | IoC Data   |
|----------|-----------|----------|------------|
| Alice    | Computer1 | EventA-1 | XYZZY-abc  |
| Alice    | Computer1 | EventA-2 | XYZZY-abc  |
| Alice    | Computer1 | EventA-3 | XYZZY-abc  |
| ...      | ...       | ...      | ...        |
| Bob      | Computer2 | EventB-1 | XYZZY-def  |
| Bob      | Computer2 | EventB-2 | XYZZY-def  |
| Bob      | Computer2 | EventB-3 | XYZZY-def  |
| ...      | ...       | ...      | ...        |
| Charlie  | Computer3 | EventC-1 | XYZZY-ghj  |
| Charlie  | Computer3 | EventC-2 | XYZZY-ghj  |
| Charlie  | Computer3 | EventC-3 | XYZZY-ghj  |

Each row of Table 4 indicates the following event data, from left to right columns: the customer to which the event can be attributed, the location of the event (e.g., identifier of the customer's computer), the name of the event, and IOC data of the event. In the example of Table 4, each customer is a person, e.g., home user or user of an organization. The IOC data is event data that is indicative of a potential or actual cyber attack. As its name indicates, the dataset of Table 4 is in table structure, with each event having a row for its event data, which may be in one or more columns.

The dataset of Table 4 may be from a campaign initiated by an attacker who specifically targeted Alice, Bob, and Charlie. Because they are from the same campaign, the IOC data of each event includes a common string "XYZZY" with an additional string that indicates the target person. In the example of Table 4, "XYZZY" represents a simple data from the cyber attack for illustration purposes only; in practice data from cyber attacks are typically longer.

In the example of Table 4, "abc" indicates Alice, "def" indicates Bob, and "ghj" indicates Charlie. For example, "XYZZY" may represent a phishing message and "abc" may represent Alice's email address, "def" may represent Bob's email address, and "ghj" may represent Charlie's email address. The common string "XYZZY" may be a useful indicator of compromise because the common string can be used to detect other targets of the campaign. Unfortunately, because the common string is part of the IOC data that includes strings that that can be used to identify the targets (i.e., "abc", "def", and "ghj"), analyzing the dataset of Table 4 as-is may violate the privacy of the targets.

The backend system 160 may comprise one or more server computers and/or a cloud computing platform, such as the Amazon Web Services (AWS) platform. The backend system 160 includes a customer events log analyzer 170, which in one embodiment is implemented as instructions that when executed by at least one processor of the backend system 160 cause the backend system 160 to receive and collect events logs 152 from the customer computers 151 (step 171), identify public, commonly-occurring indicators of compromise (IOC) data from the events logs 152 (step 172), and store and analyze the identified IOC data for cybersecurity purposes (step 173). The identified IOC data is "public" and "commonly-occurring" in that the identified IOC data occurs in a plurality of events involving a plurality of identities but is in a form that preserves the privacy of the identities.

Public IOC data may be processed for cybersecurity purposes in the backend system 160 or in another system, such as in the server computer 180. More particularly, public IOC data may be forwarded from the backend system 160 to the server computer 180 (see arrow 181). In the server computer 180, public IOC data may be processed or used for detecting cyber attacks. Information obtained from processing the public IOC data may also be employed by a cybersecurity module 153 to detect a cyber attack.

Figure 2:
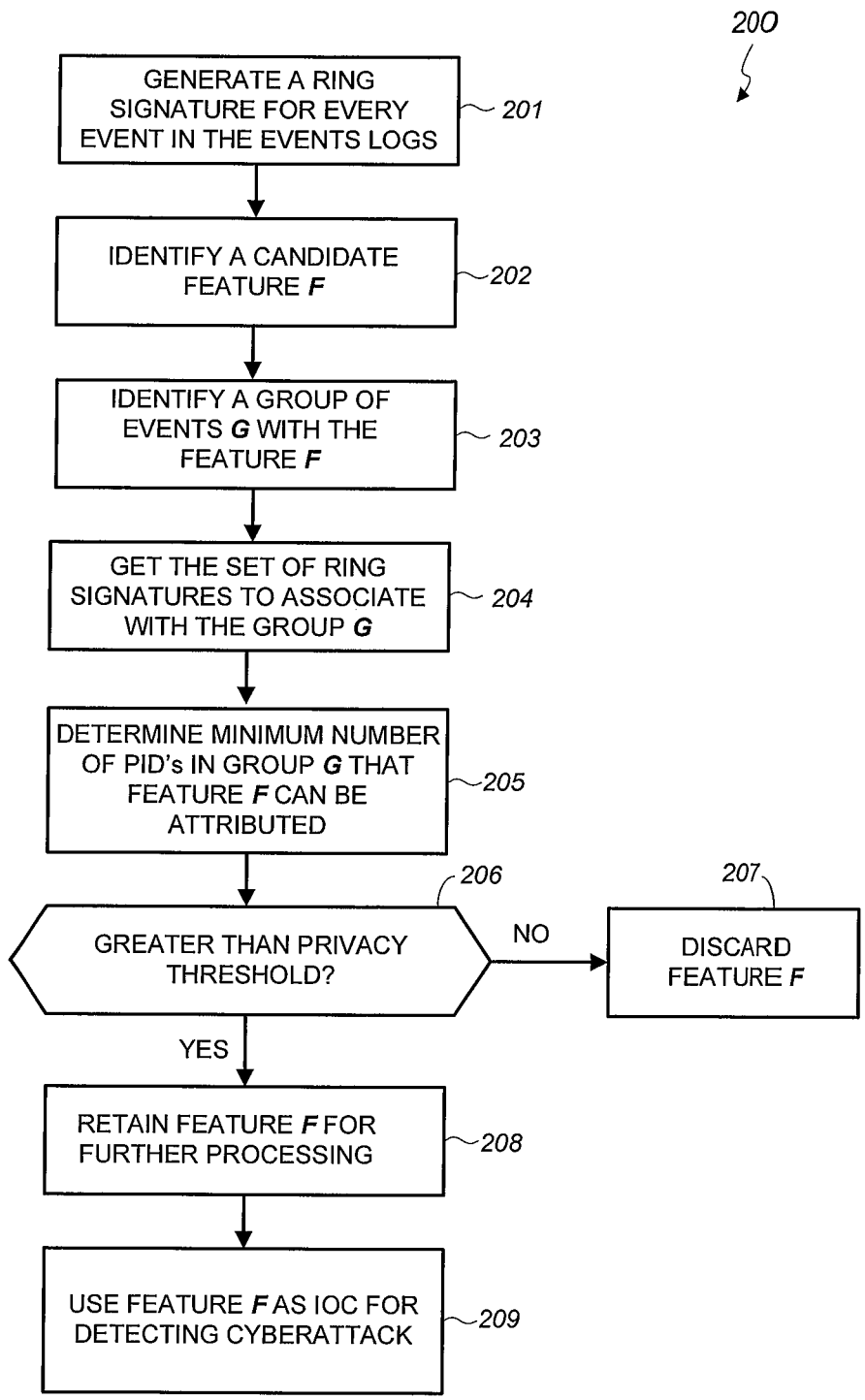
FIG. 2 shows a flow diagram of a method of analyzing customer events logs for cybersecurity with privacy protection in accordance with an embodiment of the present invention.

FIG. 2 shows a flow diagram of a method 200 of analyzing customer events logs for cybersecurity with privacy protection in accordance with an embodiment of the present invention. The method 200 may be performed by the backend system 160 running the events log analyzer 170 to analyze customer events logs.

In the method 200, ring signatures are employed to represent personal identifiers. Ring signatures, in general, are well-known in the art. Briefly, a ring signature is a type of digital signature that can be performed by any member of a set of users. A ring signature of a set of users indicates that the ring signature was employed by a member of the set of users without indicating the particular member that employed the ring signature. That is, one of the security properties of a ring signature is that it should be computationally infeasible to determine which of the set's members' keys was used to produce the ring signature. So, given a ring signature, the set of personal identifiers that data on a row can be attributed is known, but which one of the personal identifiers is not known.

In the method 200, personal identifiers are replaced with ring signatures. Therefore, given a group of data rows, there will be a set of ring signatures, with each ring signature being associated with multiple personal identifiers. For example:

RS1=Pa, Pb, Pc
RS2=Pb, Pd, Pe
. . .

with RS1 being a ring signature associated with personal identifiers Pa, Pb, Pc; RS2 being a ring signature associated with personal identifiers Pb, Pd, Pe; etc.

In step 201, a ring signature is generated for each event in collected events logs. In one embodiment, the events logs have a plurality of rows, with each row containing data of a particular event. Ring signatures of step 201 may be generated using a suitable conventional ring signature algorithm. Ring signatures have a parameter R to determine how imprecise each ring signature will be. A ring signature for an Event E that is attributable to a personal identifier (identity/customer) may be created by:

(a) Randomly generating a set of R−1 of personal identifiers; and
(b) Generating a set of ring signatures RSE for the set of R−1 personal identifiers plus randomly-generated personal identifiers.

In step 202, after the ring signatures have been generated for all events of the events logs, a candidate feature F is identified from the events logs. The candidate feature F comprises IOC data that occurs in a plurality of events. The candidate feature F may be the entirety or a portion of IOC data. In the example of Table 3, the candidate feature F may be identified from IOC data in the third column ("Data 1"), fourth column ("Data 2"), etc. The candidate feature F may be identified by longest common string (or similar techniques), clustering/pivoting techniques, using raw feature values, or other conventional methods used in the cybersecurity industry to identify IOC's. The method 200 processes candidate features to identify those that cannot be attributed to a particular customer and can thus be employed for cybersecurity purposes while protecting privacy of customers.

In step 203, a group of events G that each includes the candidate feature F is identified. In a tabular structure, the group of events G is a group of rows, with each row containing the candidate feature F.

In step 204, the set of ring signatures to associate with the group of events G is retrieved. The set of ring signatures may be obtained from ring signatures generated in step 201, with each personal identifier in the group of events G being replaced with its corresponding ring signature. Applying step 204 to Table 3 results in Table 5 below.

TABLE 5

| RS | Event ID | Data 1 | Data 2 | Data n |
|---|---|---|---|---|
| RS1 | Event_1 | . . . | . . . | . . . |
| RS2 | Event_2 | . . . | . . . | . . . |
| RS3 | Event_3 | . . . | . . . | . . . |
| . . . | . . . | . . . | . . . | . . . |
| RSj | Event_j | . . . | . . . | . . . |

In the example of Table 5, RS1 is a ring signature for the personal identifier P1, RS2 is another ring signature for the personal identifier P1, and RS3 is yet another ring signature for the personal identifier P1. In other words, the personal identifiers associated with the events are replaced with corresponding ring signatures.

The method 200 may employ a modified k-anonymity algorithm to determine if data can be attributed to a particular personal identifier. In step 205, the number k of personal identifiers in the group of events G that the feature F can be attributed is determined. k is also referred to herein as a privacy threshold. For example, if k=2, then a feature must be associated with at least k=2 customers to be considered a public feature, i.e., non-private. If the number of customers that the feature can be associated with is <k=2 (i.e., one customer), then the feature is private and cannot not be used in a public manner. Increasing k provides more privacy, because more customers must have independently contributed that feature to consider the feature to be a public feature.

A feature can be attributed to a personal identifier if the personal identifier can be identified as source of the feature, is involved in an event involving the feature, is on a same row as the feature, or otherwise being associated with the feature. Given a candidate feature F, the set of ring signatures for the group of events G may be examined to determine the minimum number of personal identifiers to which the feature F can be attributed.

From step 206 to step 208, if the minimum number of personal identifiers that the feature F can be attributed to is greater than the privacy threshold k, the candidate feature F is considered a public feature and may be marked so that it can be retained for further processing. Otherwise, if the minimum number of personal identifiers that the candidate feature F can be attributed to is not greater than the privacy threshold k, the candidate feature F is considered a private feature and discarded as in step 206 to step 207. A feature may be discarded by deleting the feature, suppressing the feature, etc. in all rows that the feature occurs.

Steps 205-208 may also be expressed as follows:
(1) Get the set of ring signatures for personal identifiers in the group of events G.
(2) $MIN_{PID}$ (F). Process the set of ring signatures to determine the minimum number of personal identifiers in the group of events G with the candidate feature F.
(3) If $MIN_{PID}$ (F)≤k, where k is the privacy threshold, then candidate feature F is considered a private feature and needs to be discarded (e.g., suppressed or deleted).
(4) If $MIN_{PID}$ (F)>k, then candidate feature F is considered a public feature and can thus be marked as such and retained for further processing.

In step 209, as part of further processing of the retained feature F, the feature F may be used as an IOC for detecting a cyber attack. Step 209 includes publishing the feature F, providing the feature F to another cybersecurity vendor, using information from the feature F to generate an antivirus signature, using information from the feature F to identify malicious emails (e.g., phishing/spam/fraud), etc.

Figure 3:
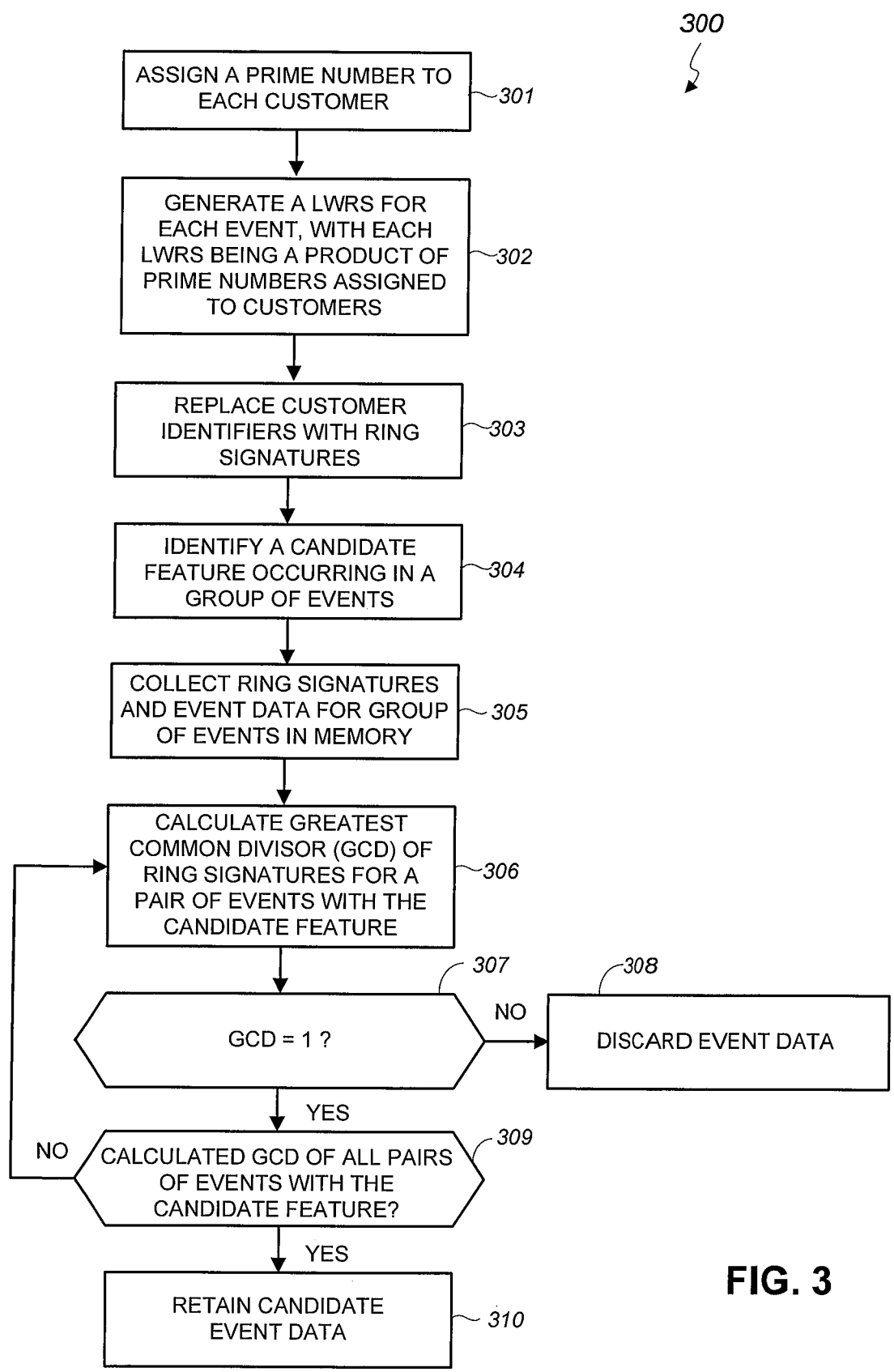
FIG. 3 shows a flow diagram of a method of analyzing customer events logs for cybersecurity with privacy protection in accordance with another embodiment of the present invention.

FIG. 3 shows a flow diagram of a method 300 of analyzing customer events logs for cybersecurity with privacy protection in accordance with an embodiment of the present invention. The method 300 may be performed by the back-end system 160 running the events log analyzer 170 to analyze customer events logs. The method 300 will be explained using the dataset of Table 4 for illustration purposes only.

Most ring signature generation algorithms create large signatures. Because the size of the ring signatures increases linearly with the number of customers, traditional ring signature approaches are difficult to apply to large sets of customers. Advantageously, embodiments of the present invention do not necessarily require the full capabilities of ring signatures. Lightweight ring signatures may be generated using prime numbers as follows:
(1) Allocate each customer a large prime number (a few hundred bits).
(2) A lightweight ring signature for a set of customers is the product of the prime numbers assigned to each customer. Optionally, an imprecision factor may be added by including nonreal customers in the set of customers.
(3) Given two light weight ring signatures, one can determine if they have one or more customers in common by performing a greatest common divisor (GCD) operation. Even on 200+ digit numbers, the calculation of GCD is very fast. Given LWRS1 as the lightweight ring signature for a customer on one row and LWRS2 as the lightweight ring signature for another customer on another row, if the GCD(LWRS1, LWRS2)=1 then we know that these 2 rows are from different customers.
(4) Perform pairwise GCD calculations to show a group of LWRS came from >k customers, where k is the privacy threshold.

In the method 300, in step 301, a unique prime number is assigned to each customer in the collected events logs. That is, each customer is assigned a different prime number.

Using Table 4 as an example, the following prime numbers are assigned to the following customers:
Alice 3
Bob 13
Charlie 19.

In other words, Alice is assigned a prime number "3", Bob is assigned a prime number "13", and Charlie is assigned a prime number "19." The prime numbers will be used to generate lightweight ring signatures as described above. Small prime numbers are used herein for illustration purposes only. In practice, large prime numbers are used.

In step 302, a lightweight ring signature is generated for each event, where the lightweight ring signature is a product of the prime numbers of the customers in the events logs.

In step 303, customer identifiers (personal identifiers in this case) in the events logs are replaced with corresponding ring signatures (generated in step 302). Table 6 below shows Table 4 after the customers' personal identifiers are replaced with corresponding ring signatures and the location data has been suppressed (because the location data may violate privacy).

TABLE 6

| Customer | Event | IoC Data |
| --- | --- | --- |
| 3 × 11 × 23 | EventA-1 | XYZZY-abc |
| 3 × 29 × 31 | EventA-2 | XYZZY-abc |
| 3 × 29 × 37 | EventA-3 | XYZZY-abc |
| ... | ... | ... |
| 5 × 13 × 17 | EventB-1 | XYZZY-def |
| 13 × 19 × 57 | EventB-2 | XYZZY-def |
| 13 × 7 × 61 | EventB-3 | XYZZY-def |
| ... | ... | ... |
| 19 × 57 × 67 | EventC-1 | XYZZY-ghj |
| 19 × 5 × 71 | EventC-2 | XYZZY-ghj |
| 11 × 19 × 73 | EventC-3 | XYZZY-ghj |

In the example of Table 6, Alice has lightweight ring signatures "3×11×23", "3×29×31", "3×29×37", etc., with each lightweight ring signature being a product of the unique prime number assigned to Alice and prime numbers assigned to other customers. More particularly, using the ring signature "3×11×23" as an example, "3" is assigned to Alice, and "11" and "23" are assigned to other customers. Similarly, Bob has lightweight ring signatures "5×13×17", "13×19× 57", "13×7×61", etc., and Charlie has lightweight ring signatures "19×57×67", "19×5×71", "11×19×73", etc.

In step 304, a candidate feature that occurs in a group of events is identified. Using Table 4 above as an example, the candidate feature may be the entirety or a portion of IOC data that occurs across several events. For example, the candidate feature may be "XYZZY-abc", "XYZZY-def", "XYZZY", etc.

In step 305, the ring signatures and the event data of the group of events are collected in the same location, such as in the main memory of the backend system 160.

In step 306, the greatest common divisor is calculated for ring signatures of a pair of events that both have the candidate feature. For example, referring to Table 6, assuming the candidate feature is "XYZZY-abc", calculation of the greatest common divisor for the lightweight ring signatures corresponding to EventA-1 ("3×11×23") and EventA-2 ("3× 29×31"), which both have the candidate feature "XYZZY-abc" would yield a greatest common divisor of 3, which can be attributed to Alice. Doing the same calculation for candidate feature "XYZZY-def" for EventB-1 and EventB-2 would yield a greatest common divisor of 13 (which can be attributed to Bob), and doing the same calculation for candidate feature "XYZZY-ghj" in EventC-1 and EventC-2 would yield a greatest common divisor of 19 (which can be attributed to Charlie). Because the lightweight ring signatures are product of prime numbers, a greatest common divisor that is not equal to 1 indicates that the candidate feature can be attributed to a customer.

A candidate feature that can be attributed to a customer cannot be further processed without violating the privacy of that customer. Accordingly, in step 307 to step 308, when the greatest common divisor of lightweight ring signatures of a pair of events that both have the candidate feature is not equal to 1, the candidate feature is considered private and is thus discarded. Otherwise, in step 307 to step 309, when the greatest common divisor of the lightweight ring signatures of the pair of events is equal to 1, the processing of the candidate feature continues until the greatest common divisor of lightweight ring signatures of all pairs of events that have the candidate feature have been calculated as in step 309 to step 306.

In step 310, the candidate feature is retained for further processing when the greatest common divisor of lightweight ring signatures of all pairs of events are equal to 1, indicating that the candidate feature cannot be attributed to a single customer. For example, assuming the candidate feature is "XYZZY", the greatest common divisor of pairs of events with the feature "XYZZY" will be equal to 1, because the feature was found to be associated with at least two customers. This means that the feature "XYZZY" cannot be attributed to any particular customer and thus can be considered public and employed as IOC data. Table 7 below shows Table 6 after processing to identify the public IOC data "XYZZY".

TABLE 7

| Customer | Event | IoC Data |
| --- | --- | --- |
| 3 × 11 × 23 | EventA-1 | XYZZY |
| 3 × 29 × 31 | EventA-2 | XYZZY |
| 3 × 29 × 37 | EventA-3 | XYZZY |
| ... | ... | ... |
| 5 × 13 × 17 | EventB-1 | XYZZY |
| 13 × 19 × 57 | EventB-2 | XYZZY |
| 13 × 7 × 61 | EventB-3 | XYZZY |
| ... | ... | ... |
| 19 × 57 × 67 | EventC-1 | XYZZY |
| 19 × 5 × 71 | EventC-2 | XYZZY |
| 11 × 19 × 73 | EventC-3 | XYZZY |

As can be appreciated from Table 7, the method 300 allows processing of collected events logs so that public IOC data can be identified. The public IOC data may be employed for various cybersecurity purposes including in the generation of antivirus signatures for detecting malicious code, identification of malicious emails (e.g., phishing, spam), sharing of the IOC data with other cybersecurity vendors and researchers, etc.

Figure 4:
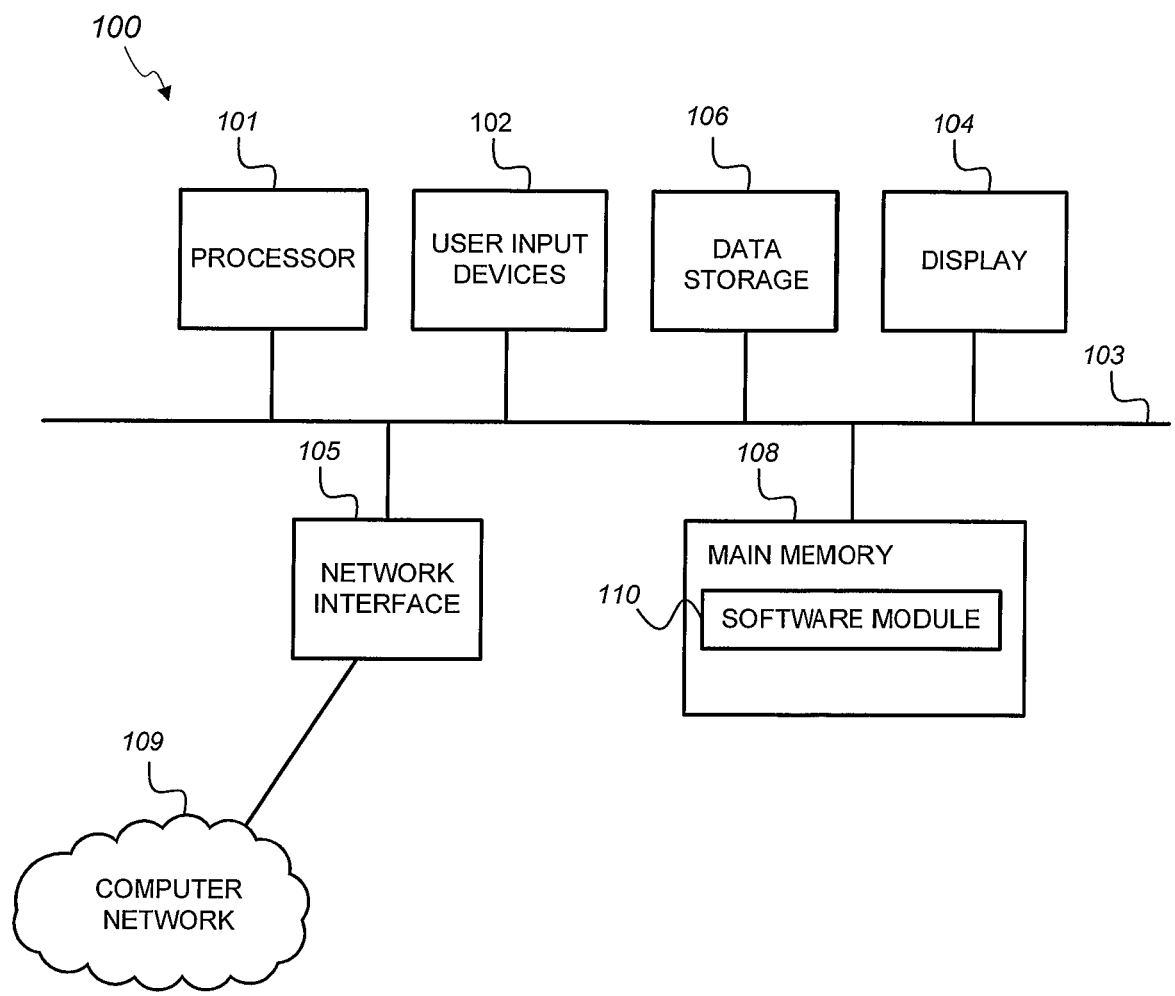
FIG. 4 shows a logical diagram of a computer system that may be employed with embodiments of the present invention.

Referring now to FIG. 4, there is shown a logical diagram of a computer system 100 that may be employed with embodiments of the present invention. The computer system 100 may be employed as a backend system or other computer described herein. The computer system 100 may have fewer or more components to meet the needs of a particular cybersecurity application. The computer system 100 may include one or more processors 101. The computer system 100 may have one or more buses 103 coupling its various components. The computer system 100 may include one or more user input devices 102 (e.g., keyboard, mouse), one or more data storage devices 106 (e.g., hard drive, optical disk, solid state drive), a display screen 104 (e.g., liquid crystal display, flat panel monitor), a computer network interface 105 (e.g., network adapter, modem), and a main memory 108 (e.g., random access memory). The computer network interface 105 may be coupled to a computer network 109, which in this example includes the Internet.

The computer system 100 is a particular machine as programmed with one or more software modules 110, comprising instructions stored non-transitory in the main memory 108 for execution by the processor 101 to cause the computer system 100 to perform corresponding programmed steps. An article of manufacture may be embodied as computer-readable storage medium including instructions that when executed by the processor 101 cause the computer system 100 to be operable to perform the functions of the one or more software modules 110. In one embodiment where the computer system 100 is configured as a backend system, the software modules 110 comprise instructions of a customer events log analyzer.

While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method of analyzing customer events logs for cybersecurity with privacy protection, the method comprising:
receiving a plurality of events logs from a plurality of computers over a computer network;
assigning a unique prime number to each customer of a plurality of customers;
replacing customer identifiers in the plurality of events logs with corresponding lightweight ring signatures, where each lightweight ring signature is a product of prime numbers that are assigned to the plurality of customers;
identifying a candidate feature among a plurality of indicators of compromise (IOC) data of the plurality of events logs, the candidate feature occurring in a group of events of the plurality of events logs;
determining a greatest common divisor (GCD) of lightweight ring signatures of each of a plurality of pairs of events of the group of events; and
when the GCD of the lightweight ring signatures of each of the plurality of pairs of events of the group of events is equal to one, using the candidate feature as a public IOC data for detecting a cyber attack.

2. The method of claim 1, wherein using the candidate feature includes publishing information from the candidate feature.

3. The method of claim 1, wherein using the candidate feature includes using information from the candidate feature to generate an antivirus signature.

4. The method of claim 1, further comprising:
when the GCD of the lightweight ring signatures of each of the plurality of pairs of events of the group of events is not equal to one, discarding the candidate feature.

5. The method of claim 4, wherein discarding the candidate feature includes deleting the candidate feature.

6. The method of claim 4, wherein discarding the candidate feature includes suppressing the candidate feature.

7. A system for analyzing customer events logs for cybersecurity with privacy protection, the system comprising:

a plurality of customer computers; and
a backend system comprising at least one processor and a memory, the memory storing instructions that when executed by the at least one processor cause the backend system to:
　receive a plurality of events logs from the plurality of customer computers over a computer network;
　assign a unique prime number to each customer of a plurality of customers indicated in the plurality of events logs;
　in data rows of the plurality of events logs, replace customer identifiers with corresponding lightweight ring signatures, where each lightweight ring signature is a product of prime numbers that are assigned to the plurality of customers;
　identify a candidate feature among a plurality of indicators of compromise (IOC) data of the plurality of events logs, the candidate feature occurring in a group of events of the plurality of events logs;
　determine a greatest common divisor (GCD) of lightweight ring signatures of each of a plurality of pairs of events of the group of events; and
　when the GCD of the lightweight ring signatures of each of the plurality of pairs of events of the group of events is equal to one, use the candidate feature as a public IOC data for detecting a cyber attack.

8. The system of claim 7, wherein the instructions stored in the memory of the backend system when executed by the at least one processor of the backend system cause the backend system to disseminate the public IOC data.

9. The system of claim 7, further comprising:
　a server computer that is configured to receive the public IOC data from the backend system.

10. The system of claim 9, wherein the server computer is configured to use information from the public IOC data to detect a cyber attack.

11. The system of claim 7, wherein the instructions stored in the memory of the backend system when executed by the at least one processor of the backend system cause the backend system to discard the candidate feature when the GCD of the lightweight ring signatures of each of the plurality of pairs of events of the group of events is not equal to one.

12. The system of claim 11, wherein the instructions stored in the memory of the backend system when executed by the at least one processor of the backend system cause the backend system to discard the candidate feature by suppressing the candidate feature in all data rows where the candidate feature occurs.

* * * * *